United States Patent [19]
Hitomi et al.

[11] Patent Number: 5,161,492
[45] Date of Patent: Nov. 10, 1992

[54] INTAKE SYSTEM FOR MULTI-CYLINDER ENGINE

[75] Inventors: Mitsuo Hitomi; Toshihiko Hattori; Masashi Marubara; Mikihito Fujii, all of Hiroshima, Japan

[73] Assignee: Mazda Motor Corporation, Hiroshima, Japan

[21] Appl. No.: 624,214

[22] Filed: Dec. 10, 1990

[30] Foreign Application Priority Data

Dec. 28, 1989 [JP] Japan .................. 1-344461

[51] Int. Cl.⁵ .......................................... F02M 35/10
[52] U.S. Cl. .......................................... 123/52 MB
[58] Field of Search ......... 123/52 M, 52 MB, 52 MC, 123/52 MF, 52 ML, 52 MV

[56] References Cited

U.S. PATENT DOCUMENTS

| | | | |
|---|---|---|---|
| 4,765,285 | 8/1988 | Kobayashi | 123/52 MB |
| 4,846,117 | 7/1989 | Hitomi et al. | 123/52 MV |
| 5,002,021 | 3/1991 | Nakata et al. | 123/52 MB |

FOREIGN PATENT DOCUMENTS

| | | | |
|---|---|---|---|
| 3426307 | 4/1985 | Fed. Rep. of Germany | 123/52 MB |
| 55-87821 | 7/1980 | Japan | 123/52 MB |
| 63-18178 | 1/1988 | Japan | 123/52 M |
| 64-316 | 1/1989 | Japan | 123/52 M |
| 1-8316 | 1/1989 | Japan | 123/52 M |
| 2-91419 | 3/1990 | Japan | 123/52 M |

*Primary Examiner*—David A. Okonsky
*Attorney, Agent, or Firm*—Fleit, Jacobson, Cohn, Price, Holman & Stern

[57] ABSTRACT

An intake system for a vehicle for delivering intake air through separate or discrete intake passages of the intake system into engine cylinders through discrete intake passages. A collector chamber and a resonator chamber connect with an upstream main intake passage and the discrete intake passages. The collector chamber communicates at one end with upstream ends of the discrete intake passages and at its another end, opposite to the one end, with the resonator chamber. The discrete intake passages are clustered or grouped together at their upstream ends and connected as a cluster to the collector chamber.

16 Claims, 5 Drawing Sheets

INTAKE SYSTEM FOR MULTI-CYLINDER ENGINE

FIELD OF THE INVENTION

The present invention relates to a novel intake system for a multi-cylinder internal combustion engine and, more particularly, to an intake system which is improved in charging efficiency with resonance effect and inertia effect.

BACKGROUND OF THE INVENTION

In recent years, a high power internal combustion engine has been developed with improved charging efficiency obtained by means of an intake system which takes advantage of kinetic effects, such as resonator effects and inertial effects, of intake air. Such an intake system is typically provided with a collector chamber, such as a surge tank, into which intake air introduced by an air cleaner is delivered through an intake passage and from which the intake air is distributed to the cylinders through separate or discrete intake passages.

In the intake system, the collector chamber serves as a primary resonator to generate pressure vibrations due to negative pressure produced by each cylinder in its intake cycle in a speed range wherein engine speeds are lower than a certain critical speed so as to obtain high charging efficiency by virtue of resonance effects. The collector chamber also serves as a space open to the atmosphere to invert negative pressure waves, generated in a downstream end portion of each discrete intake passage upon the opening of intake valve, to positive pressure waves in a speed range wherein engine speeds are higher than the certain critical speed so as to obtain high charging efficiency by virtue of inertial effects.

Typically used as such collector chambers are elongated cylindrical surge tanks and such an elongated surge tank is communicated with an upstream or main intake passage connected to either one of end walls and side wall thereof and with discrete intake passages arranged side by side and connected to the side wall. For this reason, the intake system of this type unavoidably has unequal-length discrete intake passages. This leads to unequally distribution and supply of intake air among the cylinders or to unequal resonance effects or inertial effects among the cylinders. The intake system, because of a rapidly changing path of intake air flow between the upstream intake passage and each discrete intake passage, increases the resistance of intake flow.

In an attempt to overcome such drawbacks as is described above, some intake systems have discrete intake passages whose ends clustered or grouped together at their upstream ends approximately symmetrically around a center axis of the cylindrical collector chamber and connected to the collector chamber. Such an intake system is known from Japanese Unexamined Utility Model Publication No. 60-88062.

In the intake system having a relatively small volume of collector chamber and discrete intake passages clustered or grouped together, since damping in intake air vibration propagated through the discrete intake passage is hard to occur, the discrete intake passages, as well as the collector chamber, can serve as an effective resonator space.

However, the intake system still has such shortcomings that the total volume of the discrete intake passages and collector chamber is too small to provide sufficient resonance supercharging effect, that because resonance pressure waves in the intake passage interfere with intake air before propagated into the collector chamber and therefore significantly damp, a reduction in resonance supercharging effect is unavoidable, and that because, although inertial supercharging effect for each cylinder is enhanced by the collector chamber and the discrete intake passages for the other cylinders serving as a space or chamber open to the atmosphere, the small volume of collector chamber adversely effects to greatly improving inertial supercharging effects.

SUMMARY OF THE INVENTION

A primary object of the invention is to provide an intake system whose resonance and inertial supercharging effects are greatly intensified.

The foregoing and other objects of the present invention which will become apparent as the detailed description proceeds are achieved by an intake system for a multiple-cylinder internal combustion engine having a plurality of cylinders into which intake air is delivered through separate or discrete intake passages of the intake system.

Intake system has a collector chamber and a resonator chamber disposed between an upstream or main intake passage provided with at least an air cleaner and an airflow meter and the discrete intake passages.

The collector chamber, formed generally cylindrical, communicates at its one end with downstream ends of the discrete intake passages and at its another end, opposite to the one end, with the resonator chamber. The discrete intake passages are clustered or grouped together at their upstream ends remote from the cylinders of the engine and are connected at the clustered ends to the collector chamber. Main intake passage may be connected either one of the opposite ends of the collector chamber.

BRIEF DESCRIPTION OF THE DRAWINGS

For a complete understanding of the objects, features and structure of the present invention, reference should be had to the following detailed description and accompanying drawings, wherein.

DETAILED DESCRIPTION OF THE PREFERRED EMBODIMENTS

Figure 1:
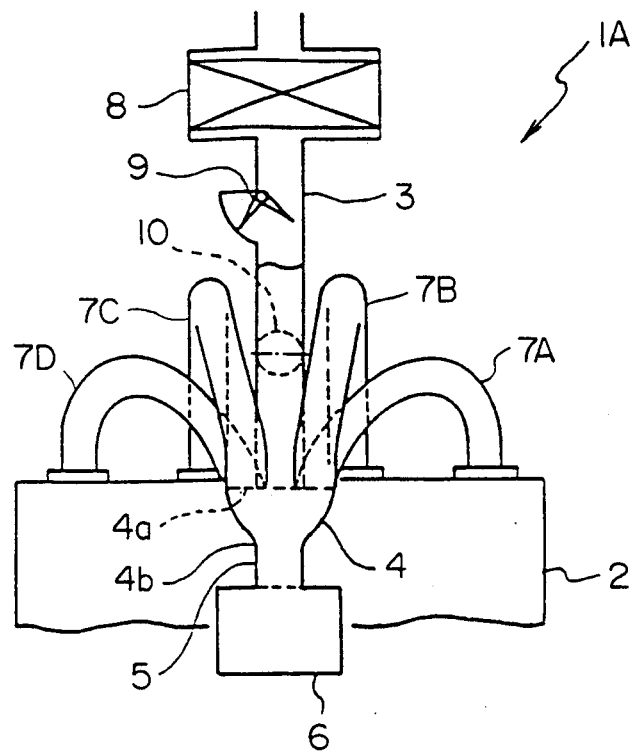
FIG. 1 is a plan view showing an intake system in accordance with a preferred embodiment of the present invention.
Figure 2:
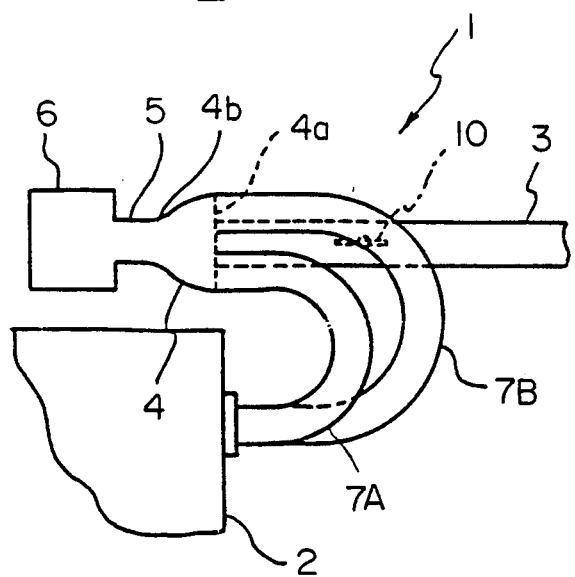
FIG. 2 is a front view of FIG. 1.

Referring to the drawings in detail, particularly to FIGS. 1 and 2, an intake system 1A in accordance with a preferred embodiment of the present invention is shown as being used with, for instance, an in-line four cylinder internal combustion engine having a cylinder head 2 mounted in a lengthwise direction of the body of a vehicle. The intake system IA comprises an upstream, or main, intake passage 3 in the form of a cylindrical pipe; a collector chamber 4, generally in the form of a truncated cone shaped box or a cylindrical box, having downstream and upstream ends 4a and 4b, respectively; a resonator chamber 6 generally in the form of a cylindrical box; and four downstream separate, or discrete, intake passages, namely first, second, third and fourth discrete intake passages 7A-7D, arranged in order from one end to the other of the engine 2.

Main intake passage 3 is provided with, in order from the upstream end thereof, an air cleaner 8, an airflow meter 9 and a throttle valve 10 all of which are well known in the art. The main intake passage 3 is coaxially connected, at its downstream end, to the center of one end of the collector chamber 4. All of the discrete intake passages 7A-7D have the same cross sectional area and loop from the cylinder head 2 to the resonator chamber 6. Upstream ends of the discrete intake passages 7A-7D are tightly grouped or joined together symmetrically about the downstream end of the main intake passage 3 and connected to the downstream end 4a of the collector chamber 4; downstream ends of the discrete intake passages 7A-7D are connected to intake ports for the cylinders (not shown) of the cylinder head 2 arranged in a straight line, respectively. The discrete intake passages 7A-7D are designed and formed to have approximately equal length so as to provide resonance effect and inertial effect in supercharging nearly equally for all cylinders. The resonator chamber 6 is disposed above and close to a near center of the top of the cylinder head 2.

Collector chamber 4, which is designed and formed to have a volume as small as possible unless impeding intake air flow in order to prevent damping of vibration in intake air propagated from the discrete intake passages 7A-7D, is joined at the upstream end 4b to the resonator chamber 6 by way of a communication passage 5, such as a cylindrical pipe, which is short in length and has substantially the same cross-sectional area as the main intake passage 3. The upstream end portion of the collector chamber 4 is tapered or gradually reduced in cross section toward the upstream end 4b. This taper may be either straight or curved.

The collector chamber 4 is designed to satisfy the following conditions:

$$Sd > 0.25 \times Sn$$

$$H/Su > 0.7 \times (Su/Sd)$$

where

Sd and Su are the cross-sectional opening areas of the downstream end 4a and upstream end 4b of the collector chamber 4, respectively;

Sn is the total area of cross-sectional opening areas of the upstream ends of all the discrete intake passages 7A-7D; and H is the distance between the downstream and upstream ends 4a and 4b of the collector chamber 4.

It has been verified empirically that the cross-sectional area ratio (Sd/Sn) should not be larger than 0.25 in order for the mean effective pressure at a tuning speed of inertia effect supercharging to be higher than that in intake systems utilizing surge tanks. That is, when the opening area Su of the upstream end 4b of the collector chamber 4 is smaller than 25% of the total cross-sectional area Sn of the upstream ends of the discrete intake passages 7A-7D, the change in area of the path of intake air from the main intake passage 3 to the collector chamber 4 or to the discrete intake passages 7A-7D is too large and the resistance of intake air can not sufficiently reduced. Therefore, the opening area Sd of the upstream end 4a of the collector chamber 4 must be determined to satisfy the first condition, $Sd > 0.25 \times Sn$, in order to sufficiently reduce the resistance of intake air and increase the output power of engine.

Further, it has also been verified empirically that the value of (H/Su)/(Su/Sd) should be larger than 0.7 in order for the mean effective pressure at a tuning speed of inertia effect supercharging to be higher than that in intake systems utilizing surge tanks. That is, the between-the ends distance H of the collector chamber 4 must be increased as the end opening area ratio, (Su/Sd), of the collector chamber 4 is increased in order to obtain a sufficient reduction in intake air resistance and an increase in engine output power; and when the value, (H/Su), is not smaller than 0.7 times the end opening area ratio, (Su/Sd), engine output power can be up as compared with intake systems utilizing surge tanks.

Resonator chamber 6, provided in order to strengthen or intensify resonance effect and inertial effect in supercharging, is formed to be larger in volume than the collector chamber 4.

In operation of the intake system 1A depicted in FIGS. 1 and 2 and described in detail above, because the downstream end 4a of the collector chamber 4 is connected to the downstream end of the main intake passage 3 and the upstream ends of all four discrete intake passages 7A-7D tightly grouped together around the downstream end of the main intake passage 3, the path of intake air flow is substantially straight or gently curves between the collector chamber 4 and the upstream portions of the discrete intake passage 7A-7D, so as to produce only a low frictional drag.

When the engine operates at speeds in r.p.m. lower than a predetermined critical engine speed, negative pressure that is produced when an intake valve for each cylinder opens, generates vibration in intake air. This intake air vibration is propagated to air in the collector chamber 4, the resonator chamber 6 and the main intake passage 3 via the discrete intake passage 7. If the frequency of vibration of the intake air is almost equal to a natural frequency of what is termed an "upstream intake system" which comprises the collector chamber 4, resonator chamber 6 and main intake passage 3, pressure waves are generated in the upstream intake system by resonance effect and propagated to the intake ports for the cylinders through the discrete intake passages 7A-7D, so as to provide sufficiently intensified resonance effect in supercharging.

Because the four discrete intake passages 7A-7D are connected, at their upstream ends tied together, to the downstream end 4a of the collector chamber 4 and the collector chamber 4 is small in volume, the vibration of intake air, transmitted or propagated from the discrete intake passages 7A-7D to the collector chamber 4, can be transmitted or propagated to the air column in the main intake passage 3 with high efficiency. As is apparent from the above, in the intake system 1A, the main intake passage 3 is made for use as a resonance space in addition to working its own original function. This not only allows the collector chamber 4 to be made more smaller in size but also prevents the damping of vibration in intake air in the collector chamber 4.

Because the collector chamber 4 is connected at the upstream end 4b opposite to the downstream end 4a to which the grouped upstream ends of the discrete intake passages 7 are connected, to the resonator chamber 6 by way of the communication passage 5, vibrations, transmitted or propagated from the intake air in the discrete intake passages 7A-7D to the intake air in the collector chamber 4, is transmitted or propagated to the intake air in the resonator chamber 6 with high efficiently, so that strong pressure waves are developed and delivered into the discrete intake passages 7A-7D through the collector chamber 4. Therefore, in the intake system 1, supercharging is greatly intensified by the propagation of pressure waves.

Particularly, because the upstream portions of the discrete intake passages 7A-7D are arranged directed toward the end of the resonator chamber 6, the efficiency of propagation of both intake air vibration and pressure waves is considerably increased.

Additionally, because a node of pressure wave is formed at a point within the collector chamber 4, there is less chance to produce interference between the intake air flow and the pressure waves and the strong pressure waves are propagated or transmitted from the resonator chamber 6 to the collector chamber 4, so that supercharging is intensified by means of the pressure waves caused by resonance effect. This contributes to intensify also resonance supercharging effect.

Furthermore, as to inertial effect in supercharging for each cylinder, because of the fact that the downstream end 4a of the collector chamber 4 is connected to the grouped upstream ends of the four discrete intake passages 7A-7D and to the downstream end of the main intake passage 3 and that therefore, the discrete intake passages for the other cylinders serve, as one functional means, as an air chamber open to the atmosphere for the cylinder, as well as the resonator chamber 6, the inertial supercharging effect is more intensified. This is true for all of the other cylinders. Accordingly, an intensification in inertial and resonance supercharging effect is equally caused among all of the cylinders.

Figure 3:
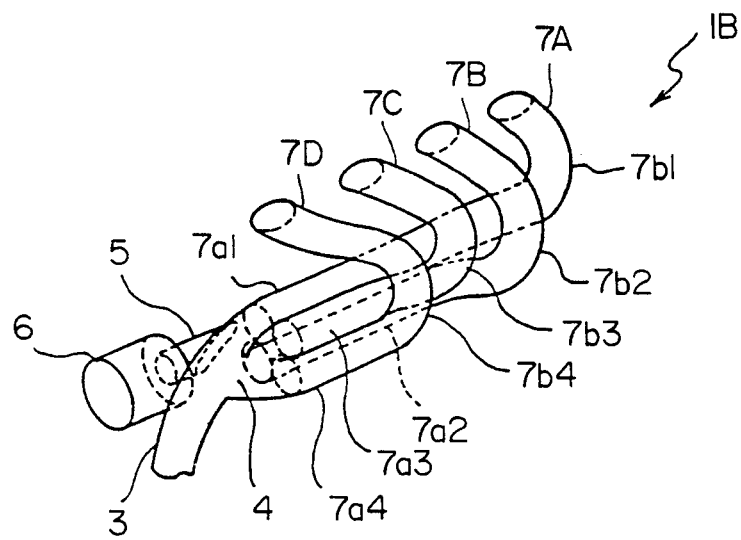
FIG. 3 is a perspective view showing an intake system in accordance with another preferred embodiment of the present invention.
Figure 4:
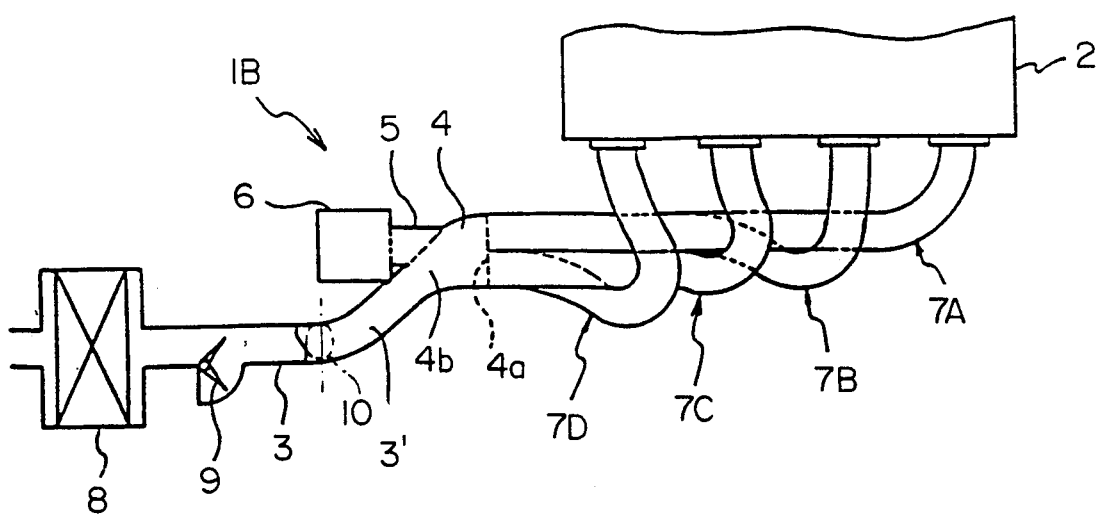
FIG. 4 is a plan view showing the intake system shown in FIG. 3.

Referring to FIGS. 3 and 4, an intake system in accordance with another preferred embodiment of the present invention is shown. The intake system 1B has a collector chamber 4 generally formed as a truncated cone and offset in the lengthwise direction of the cylinder head 2 in which a crankshaft of the engine extends, with respect to one end of the cylinder head 2 and in the transverse direction of the cylinder head 2 with respect to one side of the cylinder head 2.

First, second, third and fourth discrete intake passages 7A-7D, having an equal cross-sectional area and overall length and arranged in order as viewed from an end of the engine remote from the end on which a cylindrical resonator chamber 6 is disposed, comprise straight portions 7a1-7a4 and curved portions 7b1-7b4, respectively. The straight portions 7a1-7a4 are different in length from one another and the straight portion of each discrete intake passage has a length longer than that of the previous discrete intake passage (vis-a-vis connection with the cylinders); the curved portion 7b1-7b4 of each discrete intake passage has a length shorter than that of the previous discrete intake passage, in the same sense (vis-a-vis connection with the cylinders).

Upstream ends of the straight portions 7a1-7a4 of the discrete intake passages 7A-7D are connected to the downstream end 4a of the collector chamber 4 and downstream ends of the curved portion 7b1-7b4 are connected to the intake ports, arranged in a straight line in the cylinder head 2 of the engine, respectively.

Straight portions 7a1-7a4 of the discrete intake passages 7A-7D are tightly grouped together and arranged symmetrically about the axis passing through the center of the downstream end 4a of the collector chamber 4 and extend axially, that is in the same direction as the axis of chamber 4, so that the collector chamber 4 allows intake air introduced therein to flow into the four discrete intake passages 7A-7D, in particular the straight portions 7a1-7a4, without changing the path of flow.

Main intake passage 3 has a gently curved transitional portion and is connected at its downstream end to the upstream end 4b of the collector chamber 4 via the gently curved transitional portion 3'. This gently curved transitional portion directs the main intake passage 3 in the same direction as the upstream portions 7a1-7a4 of the discrete intake passages 7A-7B extend. The resonator chamber 6 is connected to the collector chamber 4 by way of the communication passage 5, such as a cylindrical pipe. In particular, the communication passage 5 is straight and connects one end of the resonator chamber 6 to a side wall of the collector chamber 4 so that the connected end of the resonator chamber 6 is oriented right opposite to the upstream ends of the discrete intake passages 7.

Intake system 1B of this embodiment, because of the main intake passage 3 with the gently curved downstream portion connected to the upstream end 4b of the collector chamber 4, the path of intake air flow does not sharply change and extends across the collector chamber 4 to the discrete intake passages 7A-7D, so that the intake air can flow with only a low resistance against the intake passages and therefore, the supercharging of intake air is performed with greatly increased efficiency.

Figure 5:
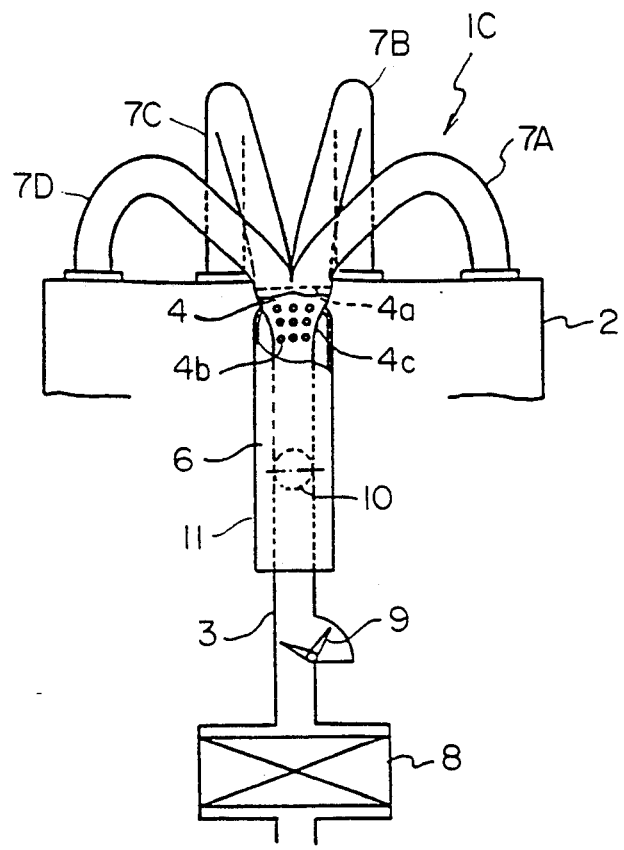
FIG. 5 is a plan view showing an intake system in accordance with still another preferred embodiment of the present invention.

Referring to FIG. 5, showing an intake system in accordance with still another preferred embodiment of the present invention, an intake system 1C has a collector chamber 4 shaped as an open ended generally truncated cone box. Four, namely first to fourth, discrete intake passages 7A-7D, which are the same in structure and arrangement as the discrete intake passages of the intake system 1A shown in FIGS. 1 and 2, have their upstream ends grouped and united together and connected to a downstream end 4a of the collector chamber 4. A straight, main intake passage 3 is coaxially connected, at its downstream end, to the upstream end 4b of the collector chamber 4. The collector chamber 4 may, if desired, be formed as an integral part of the main intake passage 3.

A closed-ended cylindrical pipe 11, coaxially encloses or surrounds a downstream half portion or length of the main intake passage 3 and the collector chamber 4 so as to define therebetween a closed cylindrical or annular space serving as a resonance chamber 6. As is clearly shown in FIG. 5, the collector chamber 4 and the resonator chamber 6 are communicated with each other by communication means in the form of a number of holes 4c formed in the wall of the collector chamber 4 in which the upstream end opening is formed.

In the intake system 1C of this embodiment, because of the main intake passage 3 coaxially connected to the upstream end 4b of the collector chamber 4, a straight path is formed for intake air flow between the main intake passage 3 and the collector chamber 4 and extends gently curving into the discrete intake passages 7A–7D, whereby intake air can flow with a considerably reduced resistance, so as to increase supercharging efficiency.

Furthermore, because the resonator chamber 6 is formed to enclose the downstream half portion of the main intake passage 3 and also because the communication means, for communicating between the collector chamber 4 and resonator chamber 6, has no length, the intake system 1C of this embodiment is made compact and small in size.

Figure 6:
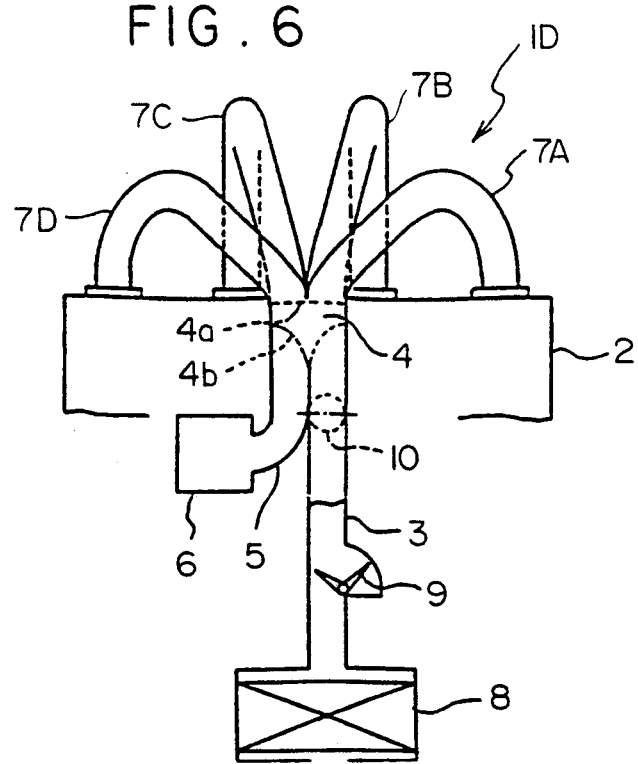
FIG. 6 is a plan view showing an intake system in accordance with a further preferred embodiment of the present invention.

Referring to FIG. 6 showing an intake system in accordance with another preferred embodiment of the present invention, an intake system 1D has a generally cylindrically shaped collector chamber 4. First to fourth discrete intake passages 7A–7D, which are the same in structure and arrangement as the discrete intake passages of the intake system 1A shown in FIGS. 1 and 2, have their upstream ends grouped together and united together and connected to a downstream end 4a of the collector chamber 4. The collector chamber 4 communicates with both a straight main intake passage 3 connected at its downstream end to one half of the upstream end 4b of the collector chamber 4 and a generally L-shaped communication passage 5 connected at one end to another half of the upstream end 4b of the collector chamber 4. The L-shaped communication passage 5 is disposed adjacent to and extends parallel with the main intake passage 3 and is coupled at its other end to a cylindrical resonator chamber 6 disposed away, that is spaced from the main intake passage 3.

Figure 7:
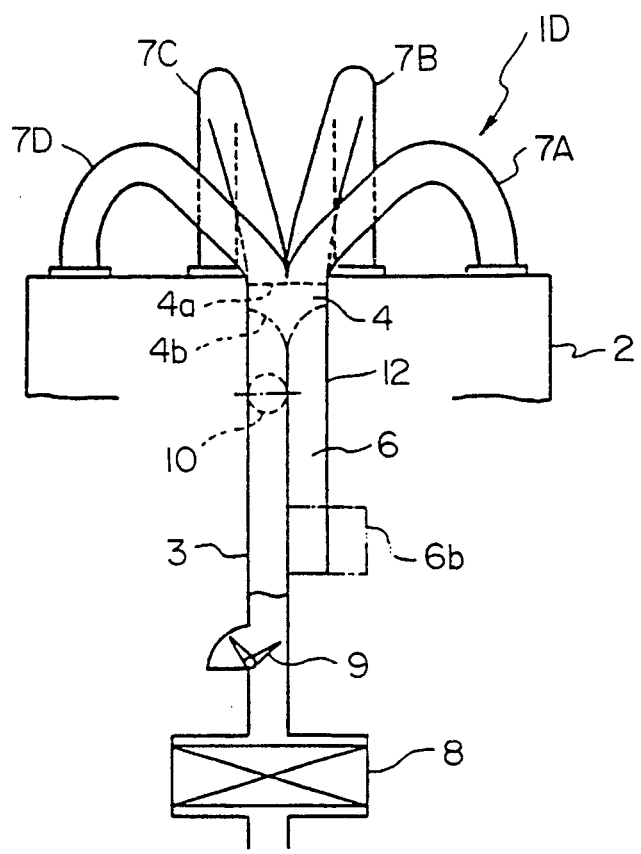
FIGS. 7 through 9 are plan views showing various variants of the intake system shown in FIG. 6, respectively.
Figure 8:
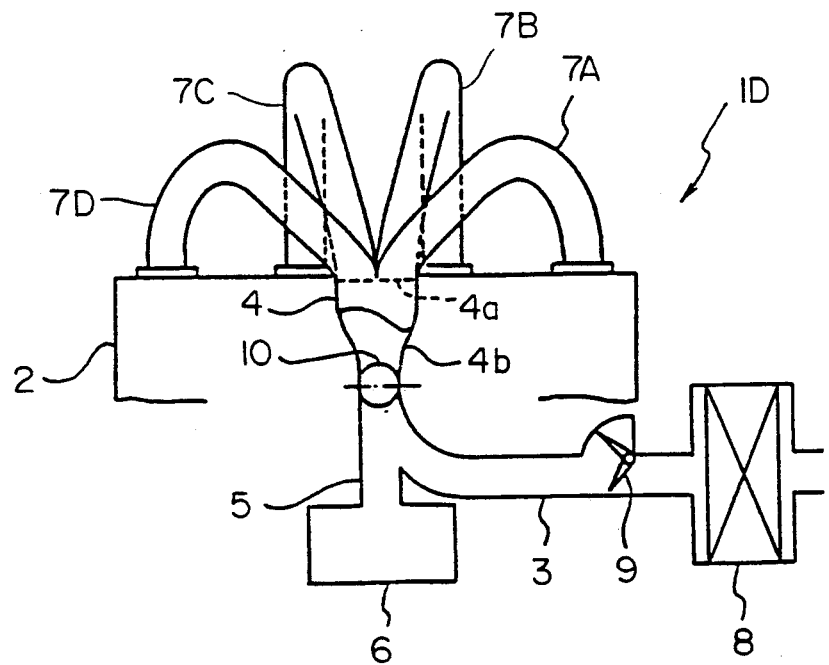
Figure 9:
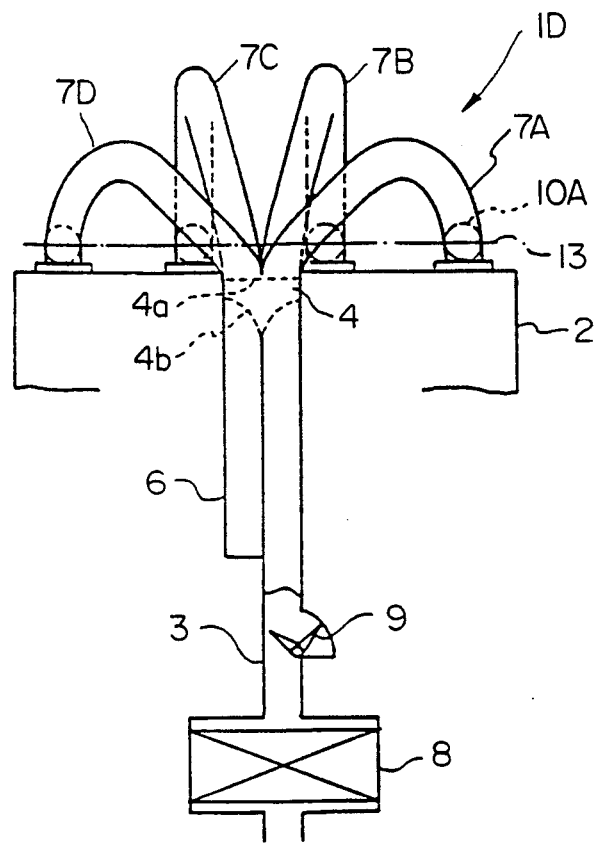

The intake system 1D, shown in FIG. 6, may be variously modified as is shown in FIGS. 7, 8 or 9. That is, in the intake system 1D shown in FIG. 7, the collector chamber 4 communicates with both a straight main intake passage 3 connected at its downstream end to one half of the upstream end 4b of the collector chamber 4 and a straight pipe 12 connected at one of its ends to another half of the upstream end 4b of the collector chamber 4. The straight cylindrical pipe 12, whose other end is closed, forms a cylindrical space therein serving as a resonator chamber 6. If desirable, a distinct and separate resonator chamber 6 may be provided, see chamber 6b at the end of pipe 12 as shown in phantom in FIG. 7.

FIG. 8 shows another variant of the intake system 1D. A collector chamber 4, shaped in the form of a generally truncated cone is connected coaxially to a resonator chamber 6 by a straight communication passage 5. A main intake passage 3, having an elbow bending downstream, joins in wye fashion with the straight communication passage 5 before the collector chamber 4. A throttle valve 10 is specifically disposed just before the collector chamber 4 where the main intake passage 3 and straight communication passage 5 extend in common.

Locating the throttle valve 10 between the collector chamber 4 and resonator chamber 6 improves the responsiveness of the engine to acceleration and deceleration since the throttle valve 10 is not adversely affected by intake air supercharged into the resonator chamber 6.

FIG. 9 shows another variant of the intake system 1D that has the same structure and function regarding collector chamber 4, resonator chamber 6 and discrete intake passages 7A–7D as described regarding the intake system shown in FIG. 7.

Provided, in place of the throttle valve 10 in the intake system 1D of any previous embodiment, are four, namely first to fourth, throttle valves 10A–10D disposed in upstream end portions of the discrete intake passages 7A–7D, respectively. All of the throttle valve 10A–10D are linked to and connected by a common drive shaft 13, that is ganged together and rotated in common by shaft 13 which is driven by known means.

The provision of throttle valves 10A–10D disposed in all discrete intake passages 7A–7D gives more improvement in the responsiveness of the engine to acceleration and deceleration.

Figure 10:
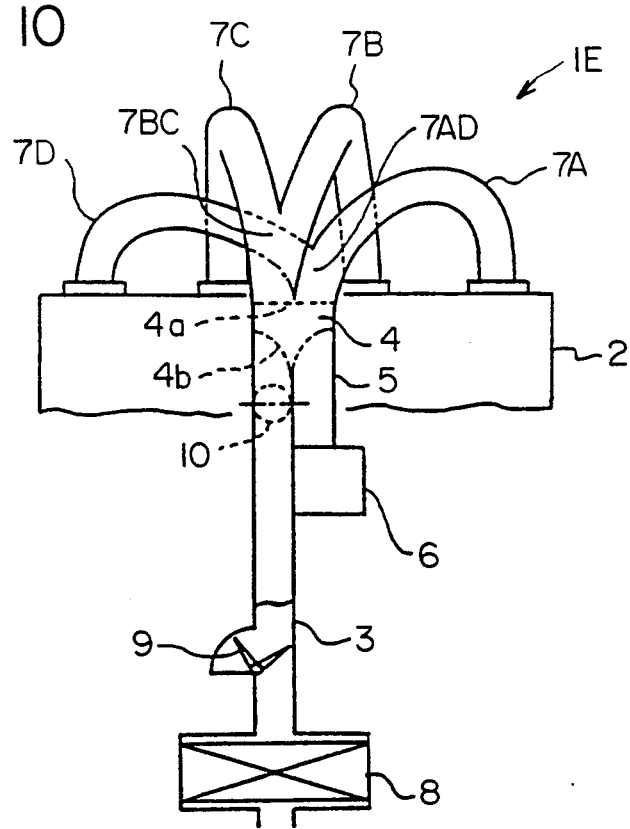
FIG. 10 is a plan view showing an intake system in accordance with a still further preferred embodiment of the present invention.

Referring to FIG. 10 showing an intake system in accordance with another preferred embodiment of the present invention, the intake system 1E has four, namely first to fourth, discrete intake passages 7A–7D connected, respectively, to first to fourth cylinders whose firing order is 1-3-4-2. The first and fourth discrete intake passages 7A and 7D are integrated together at their upstream end portions by a transitional passage 7AD; the second and third discrete intake passages 7B and 7C are integrated together at their upstream end portions by a transitional passage 7BC. Each transitional passage 7AD or 7BC is formed integral with each group of discrete intake passages 7A and 7D or 7B and 7C and is connected to one end of the downstream end 4a of the collector chamber 4. The intake system 1E provides good effects like those as described in the previous embodiments shown in FIGS. 5 through 7.

It is noted that any of the intake systems described above may be used with any known V-type six-cylinder internal combustion engine as well. In the case of being used with V-type six-cylinder internal combustion engines, the intake system should be provided with a collector chamber 4 and resonator chamber 6 for those cylinders formed in each bank of the V-type six-cylinder engine.

It is to be understood that although the invention has been described in detail with respect preferred embodiments thereof, various other embodiments and variants are possible which fall within the spirit and scope of the invention, and such embodiments and variants are intended to be covered by the following claims.

What is claimed is:

1. An intake system for delivering intake air into cylinders of a multiple-cylinder internal combustion engine comprising:
   an intake passage for introducing intake air;
   a collector chamber, having opposite ends, connected to a downstream end of said intake passage;
   a plurality of discrete intake passages connected at their downstream ends to the cylinders of an engine, respectively, and at their upstream ends to one end of said collector chamber, said discrete intake passages being joined together at their upstream ends; and a resonator chamber connected to said collector chamber spaced from said one end thereof.

2. An intake system as recited in claim 1, wherein said intake passage is connected to an end of said collector chamber opposite said one end.

3. An intake system as recited in claim 2, wherein said resonator chamber is connected to said collector chamber by intercommunication means.

4. An intake system as recited in claim 3, wherein said resonator is shaped in a form of a pipe.

5. An intake system as recited in claim 3, wherein said resonator is shaped in a form of a box.

6. An intake system as recited in claim 3, wherein said intercommunication means is a pipe.

7. An intake system as recited in claim 4, wherein said pipe is juxtaposed to said intake passage.

8. An intake system as recited in claim 7, wherein said intercommunication pipe is formed integrally with said resonator chamber.

9. An intake system as recited in claim 4, wherein said intake passage is connected to said intercommunication pipe.

10. An intake system as recited in claim 4, wherein said resonator chamber is formed as a close ended cylindrical chamber surrounding said collector chamber and a downstream portion of said intake passage.

11. An intake system as recited in claim 10, wherein said communication means comprises a plurality of holes formed in said another end of said collector chamber.

12. An intake system for delivering intake air into cylinders of a multiple-cylinder internal combustion engine comprising:
   an intake passage for introducing intake air;
   a collector chamber, having opposite ends, connected to a downstream end of said intake passage;
   a plurality of discrete intake passages connected at their downstream ends to the cylinders of an engine, respectively, and at their upstream ends to one end of said collector chamber, said intake passage being connected to said one end of said collector chamber; and
   a resonator chamber connected to said collector chamber spaced from said one end thereof.

13. An intake system as recited in claim 12, wherein upstream end portions of said discrete intake passages are arranged symmetrically relative to said downstream end of said intake passage.

14. An intake system as recited in claim 13, wherein said resonator chamber is connected to said collector chamber by intercommunication means.

15. An intake system as recited in claim 14, wherein said intercommunication means is a pipe.

16. An intake system as recited in claim 14, wherein said intercommunication pipe is formed integrally with said collector chamber.

* * * * *